United States Patent [19]

Hardy

[11] Patent Number: 5,410,836
[45] Date of Patent: May 2, 1995

[54] FLY FISHERMAN'S LURE HOLDER

[76] Inventor: Richard A. Hardy, 8828 Pecan Cir., West Jordan, Utah 84088

[21] Appl. No.: 181,301

[22] Filed: Jan. 13, 1994

[51] Int. Cl.6 .................................................. A01K 97/06
[52] U.S. Cl. ...................................... 43/57.1; 43/54.1
[58] Field of Search ............................ 43/54.1, 57.1; 206/315.11

[56] References Cited

U.S. PATENT DOCUMENTS

| 1,993,144 | 3/1935 | Kasdan | 43/57.1 |
| 2,540,340 | 2/1951 | Linblade | 43/57.1 |
| 2,596,214 | 5/1952 | Corkran | 43/57.1 |
| 2,657,497 | 11/1953 | Beaver | 43/57.1 |
| 2,734,306 | 2/1956 | Holdeman | 43/57.1 |
| 2,765,576 | 10/1956 | Kurek | 43/54.1 |
| 2,781,606 | 2/1957 | Hoffhines | 43/57.1 |
| 2,831,289 | 4/1958 | Klinghoffer | 43/57.1 |
| 3,897,650 | 8/1975 | Pilston | 43/54.1 |
| 4,020,584 | 5/1977 | Michal | 43/57.1 |
| 4,942,691 | 7/1990 | Hwang | 43/57.1 |

*Primary Examiner*—Kurt Rowan

[57] ABSTRACT

A fly fisherman's lure holder including a multiplicity of permanently adjoined tubular compartments each having an open and a closed end for the purpose of holding fishing lures and more particularly for holding those lures used in fly fishing. The lure holder has annular permanent magnets affixed to the open end of each tubular compartment. In use, a lure placed in a compartment is removed by inverting the compartments thereby having the open ends pointing downward. The lures contained therein are prevented from falling out by the force of the permanent magnet which captures the lure and affixes it to the tube interior sidewall such that a portion of the lure remains outside the tube open end. The portion of the lure outside the tube is grasped by the fisherman and the lure is readily extracted for use.

2 Claims, 4 Drawing Sheets

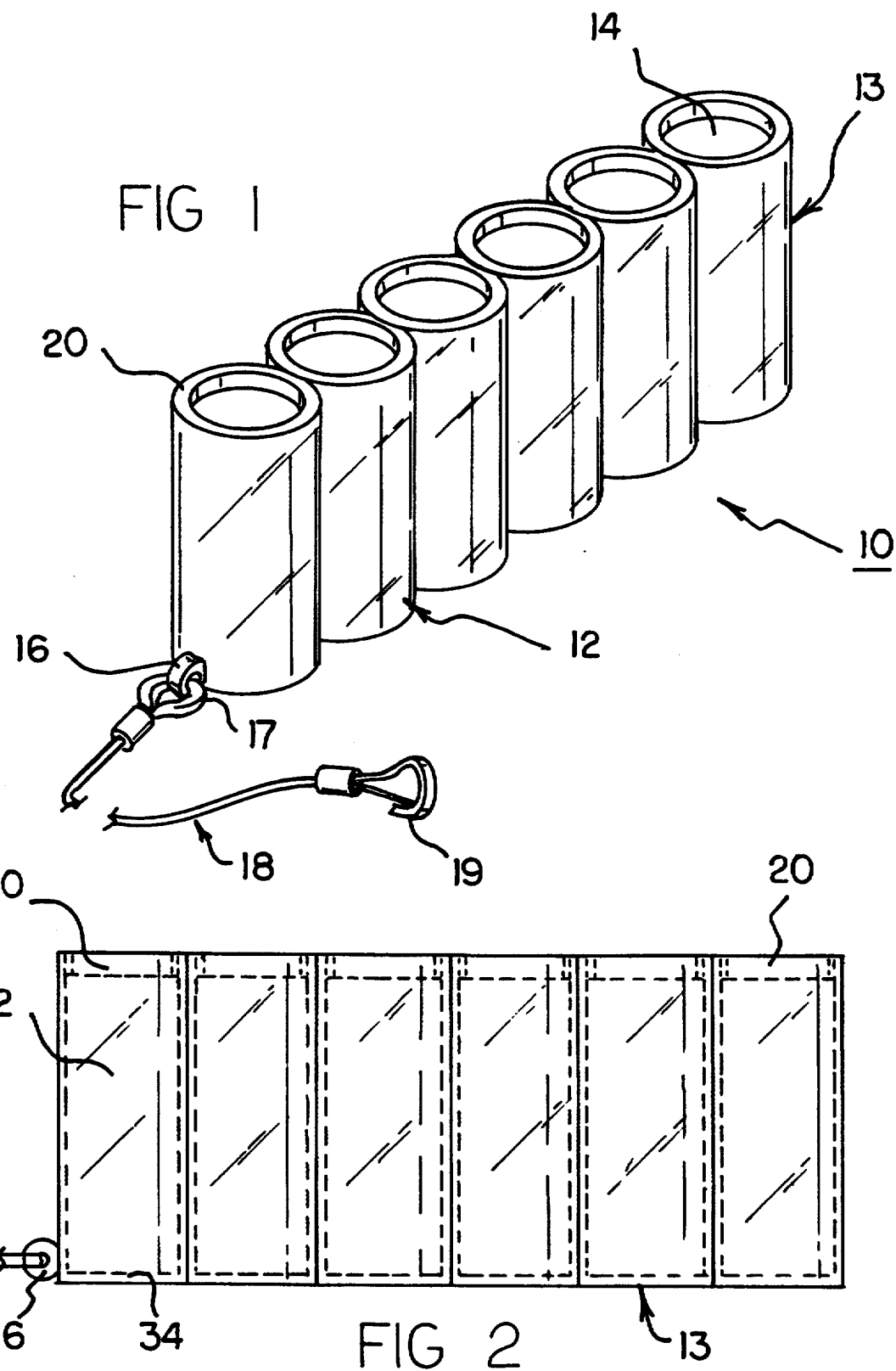

FLY FISHERMAN'S LURE HOLDER

BACKGROUND OF THE INVENTION

1. Field of the Invention

The present invention relates to fishing lure holders and more particularly pertains to a fly fisherman's lure holder which may be conveniently attached to the person of a fly fisherman and enable the fisherman to retrieve and replace fly lures with the use of a single hand.

2. Description of the Prior Art

The use of lure holders for the sport and food gathering process of fishing is known in the prior art. More specifically, fishing lure holders heretofore devised and utilized for the purpose of holding fly fishing lures on one's person during fishing are known to consist basically of familiar, expected and obvious structural configurations, notwithstanding the myriad of designs encompassed by the crowded prior art which have been developed for the fulfillment of countless objectives and requirements.

The present invention is directed to improving devices for holding fishing lures on one's person in a manner which is safe, secure, economical and aesthetically pleasing.

For example, U.S. Pat. No. 3,638,843 to Ortynski discloses a wearable fisherman's lure and fly carrier affixed to the fisherman's person by a belt and having a multiplicity of compartments for the purpose of holding lures wherein all compartments are simultaneously opened or closed by a single lid. When lures are disposed within the carrier for the purpose of storage the lure compartment portion of the carrier is rotated presenting the lures in a vertical arrangement. A reversal of the rotation and opening of the lid presents all the lures in a horizontal disposition wherein access is possible for manual lure removal and use. A primary disadvantage in the Ortynski prior art is a propensity for loss of one or more lures resulting from jarring incurred during the lid opening process or in the event the fisherman loses footing while preparing for a lure change. The present invention employs a permanent magnetic lure retainer and does not generally require any lid or other closure to prevent lure loss under a variety of adverse conditions. Furthermore, the lid of the Ortynski invention is susceptible to breakage and since the lid necessarily extends more than two lure lengths away from the fisherman's body there is a likelihood of the entire carrier becoming entangled in any line or equipment employed in the art of fishing. The present invention presents no more or less firm extension away from the fisherman's body when used, rather the lure holder is simply inverted and a lure is grasped for simple removal with minimal danger of entanglement with any lines or equipment.

In U.S. Pat. No. 4,947,577 to Abbotoy a fishing lure container is disclosed. The Abbotoy invention comprises a folding fishing lure assembly having at least two tiers of detachable capped tubes in which lures are stored for use. The lure container disclosed is affixed to an interior sidewall of a boat using an inverted J shaped hook and is not generally described as being worn by an individual. The present invention comprises a multiplicity of tubular lure holders incapable of detachment and having no lids therein being unsusceptible to loss or misplacement of these critical parts. And furthermore, the present invention is designed for simple wear on the person of the fisherman and is not solely limited to employ from a boat or other watercraft.

In U.S. Pat. No. 4,073,085 to Stremeckus a fish lure box is described having a hingedly attached lid and a hingedly attached interior panel which in combination cover and hold all the lures contained therein in a organized manner. The Stremeckus invention is not generally affixable to the person of a fisherman and the operations required to extract a single lure from the box are not readily nor rapidly performable during an active fishing session. The present invention likewise presents organization of lures however a significant advantage lies in the ability of an untrained fisherman to invert the lure holder and extract a single lure in a single operation and using one hand.

In U.S. Pat. No. 5,025,588 to Echols a jig and fly box is disclosed for holding and displaying a multiplicity of fishing lures for facilitating selection of a single lure from a large assortment. A disadvantage in this prior art lies in a lack of a capability for wear by fishermen and the complexity of operations involved in removal of a single lure. The present invention is worn by fishermen and provides for equivalent visual identification and selection of a lure and, most importantly, enables a fisherman to extract a lure with one hand in a single operation.

U.S. Pat. No. 4,681,2880 to Beneke discloses a container for an offshore fishing lure. The disclosure teaches a singular capped tubular fishing lure holder having a slot in said cap and two opposing hooks affixed to the tube ends in a manner permitting the leader line of an enclosed fishing lure to be externally wrapped and thereby stored about the two hooks. The disclosure makes no provision for holding a multiplicity of lures or an interattachement to other similar tubular containers. Furthermore, there are no provisions for a magnetic lure retainer. There is no teaching to affix the container to the fisherman's person. The present invention comprises a structure for magnetically holding a multiplicity of lures on the person of a fisherman and is not generally employed for those lures having long leaders as in offshore fishing.

In this respect, the fly fisherman's lure holder according to the present invention substantially departs from the conventional concepts and designs of the prior art, and in so doing provides an apparatus primarily developed for the purpose of holding lures used in fly fishing or similar fishing forms wherein the fisherman requires rapid change of a lure with a single hand and without having access to boats, tables or provisions other than those carried upon his person.

Therefore, it can be appreciated that there exists a continuing need for new and improved fly fisherman's lure holder which can be used to hold fishing lures on the person of a fisherman and a method of removing the lures using one hand only. In this regard, the present invention substantially fulfills this need.

As illustrated by the background art, efforts are continuously being made in an attempt to improve fishing lure holders. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of fishing lure holders now present in the prior art, the present invention provides an improved fly fisherman's lure holder construction wherein the same can be utilized for holding fishing lures on the person of a fisherman during the fishing process and making available any lure so held for extraction and use by a single operation using one hand As such, the general purpose of the present invention, which will be described subsequently in greater detail, is to provide a new and improved fly fisherman's lure holder apparatus and method which has all the advantages of the prior art fishing lure holders and none of the disadvantages.

The invention is defined by the appended claims with the specific embodiment shown in the attached drawings. For the purpose of summarizing the invention, the invention may be incorporated into multiplicity of conjoined tubular structures of sufficient dimension to hold fishing lures permanently capped on one end and open at the other wherein said open end is fitted with an annular magnet for the purpose of retaining the generally ferromagnetic lures. The entire assembly of tubes is equipped with an eyelet and a strap for attachment to the person of the fisherman.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved fly fisherman's lure holder.

It is therefore an additional object of the present invention to provide a new and improved fly fisherman's lure holder which has all the advantages of the prior art fly fisherman's lure holders and none of the disadvantages.

It is another object of the present invention to provide a new and improved fly fisherman's lure holder which may be easily and efficiently manufactured and marketed.

It is a further object of the present invention to provide a new and improved fly fisherman's lure holder which is of a durable and reliable construction.

An even further object of the present invention is to provide a new and improved fly fisherman's lure holder which is susceptible of a low cost of manufacture with regard to both materials and labor, and which accordingly is then susceptible of low prices of sale to the consuming public, thereby making such fly fisherman's lure holders economically available to the buying public.

Still yet another object of the present invention is to provide a new and improved fly fisherman's lure holder which provides in the apparatuses and methods of the prior art some of the advantages thereof, while simultaneously overcoming some of the disadvantages normally associated therewith.

Still another object of the present invention is to provide a new and improved fly fisherman's lure holder which holds a multiplicity of fishing lures in a transparent container wherein each lure is housed in a separate container said containers being joined to form a single device.

Yet another object of the present invention is to provide a new and improved fly fisherman's lure holder having a flexible straplike attachment to the person of a fisherman.

Even still another object of the present invention is to provide a new and improved fly fisherman's lure holder having a permanent magnet insert for the purpose of maintaining fishing lures within the holder until manually extracted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the fly fisherman's lure holder showing the arrangement of tubular lure holding cells.

FIG. 2 is a side elevational view of the fly fisherman's lure holder.

DESCRIPTION OF THE PREFERRED EMBODIMENT

Figure 3:
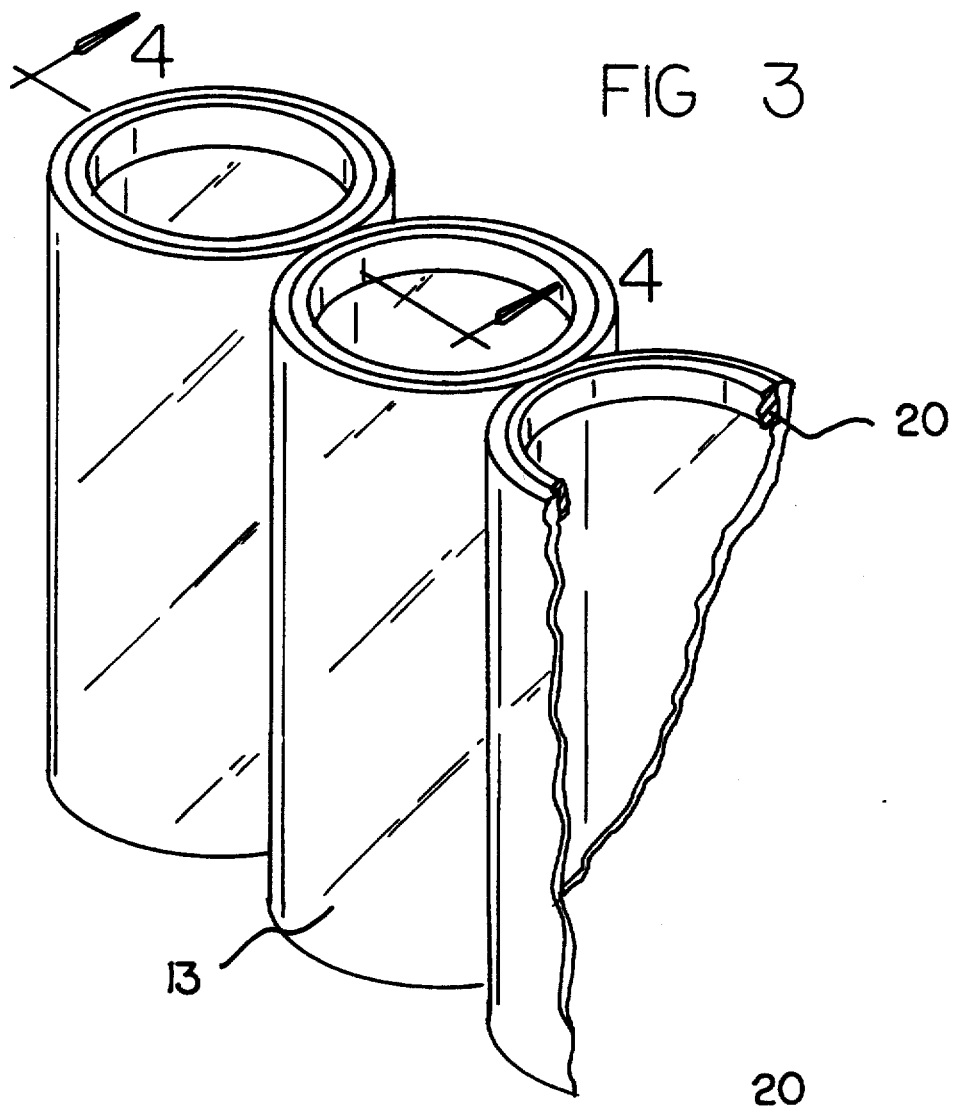
FIG. 3 is fragmentary perspective view of the fly fisherman's lure holder showing the annular permanent magnetic inserts.

With reference now to the drawings, and in particular to FIG. 1 thereof, a new and improved fly fisherman's lure holder embodying the principles and concepts of the present invention and generally designated by the reference numeral 10 will be described.

From an overview standpoint, the fly fisherman's lure holder is adapted for use with fishing lures to provide a superior degree of accessibility enabling a fisherman to easily extract a particular lure with one hand. See FIG. 1. The fly fisherman's lure holder comprises a multiplicity of tubular compartments 12 permanently interconnected to form a singular unit 13 having a strap means 18 for attachment to the person of a fisherman, and furthermore each tubular compartment 12 has an annular permanently magnetic member 20 at one end and a non-removable cap at another. The fly fisherman's lure holder 10 is initially prepared by loading the tubular compartments 12 with fishing lures as desirable for use in fishing. Whenever it is desirable to extract a fishing lure, unit 13 is rotationally disposed to a position wherein the lures contained therein fall toward annular magnetic member 20 where magnetic force prevents said lures from falling further and exiting the compartment. The fisherman may extract a single lure or replace a lure to an empty compartment 12 as desired.

Figure 4:
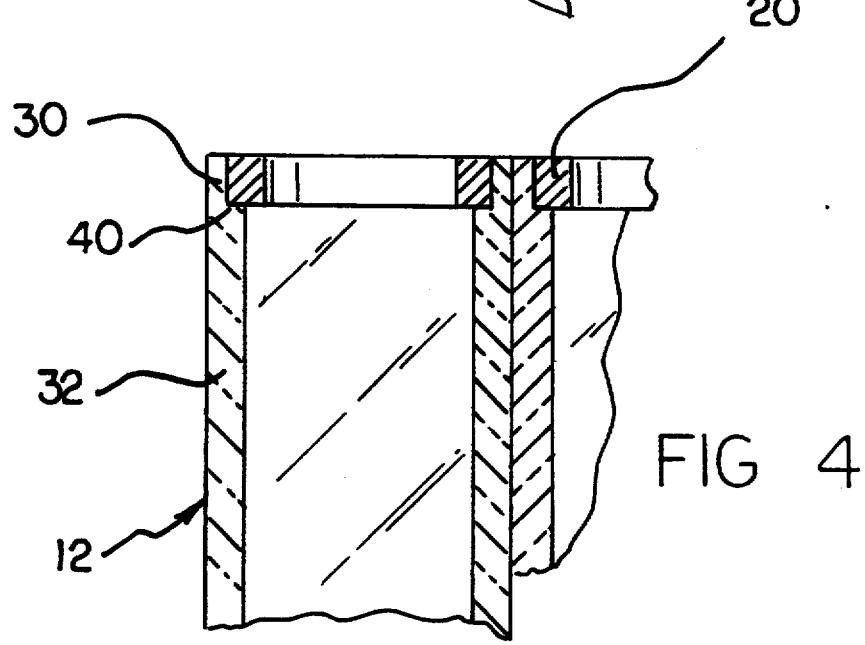
FIG. 4 is a fragmentary side sectional view of the fly fisherman's lure holder taken substantially upon the plane indicated by the section line 4—4 of FIG. 3.

More specifically, it will be noted that the fly fisherman's lure holder 10 comprises a series of tubular structures forming lure holding compartments 12. See FIG. 2. Each compartment 12 comprises a top portion 30, a central portion 32, and a bottom portion 34. See FIGS. 3 and 4. The top portion is open and has an expanded diameter portion forming a step 40 said step engaging magnetic member 20 for the purpose of retention. Retention of magnetic member 20 is achieved by an adhesive such as an epoxy or a cyanoacrylate applied at the interfacial portions of magnetic member 20 and compartment 12.

Figure 5:
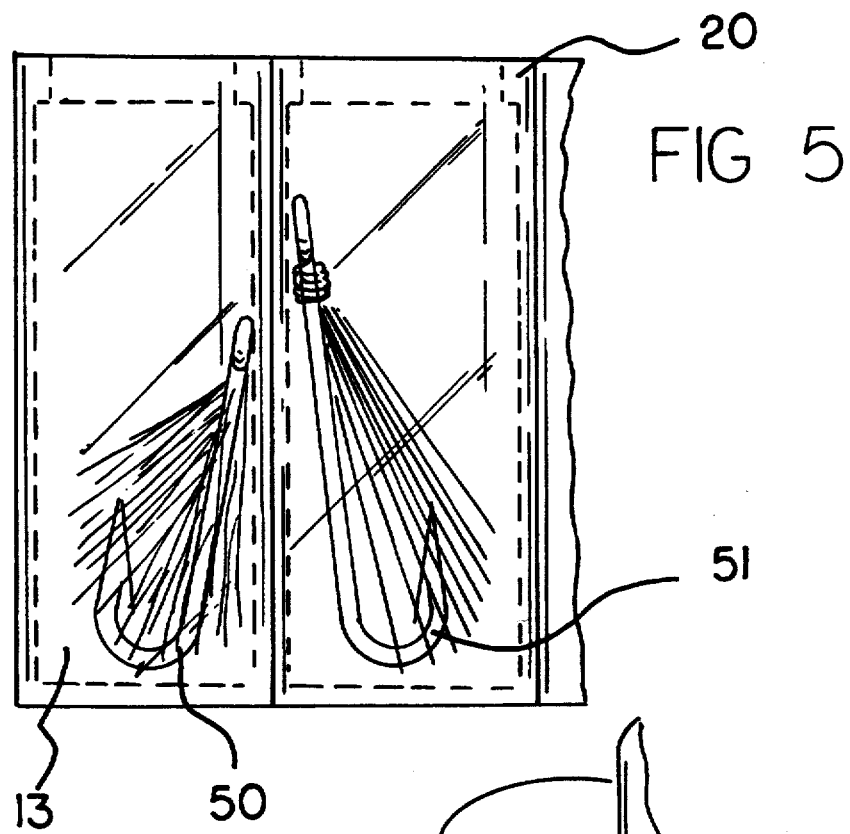
FIG. 5 is a fragmentary side view of the fly fisherman's lure holder having lures in a stowed position.
Figure 6:
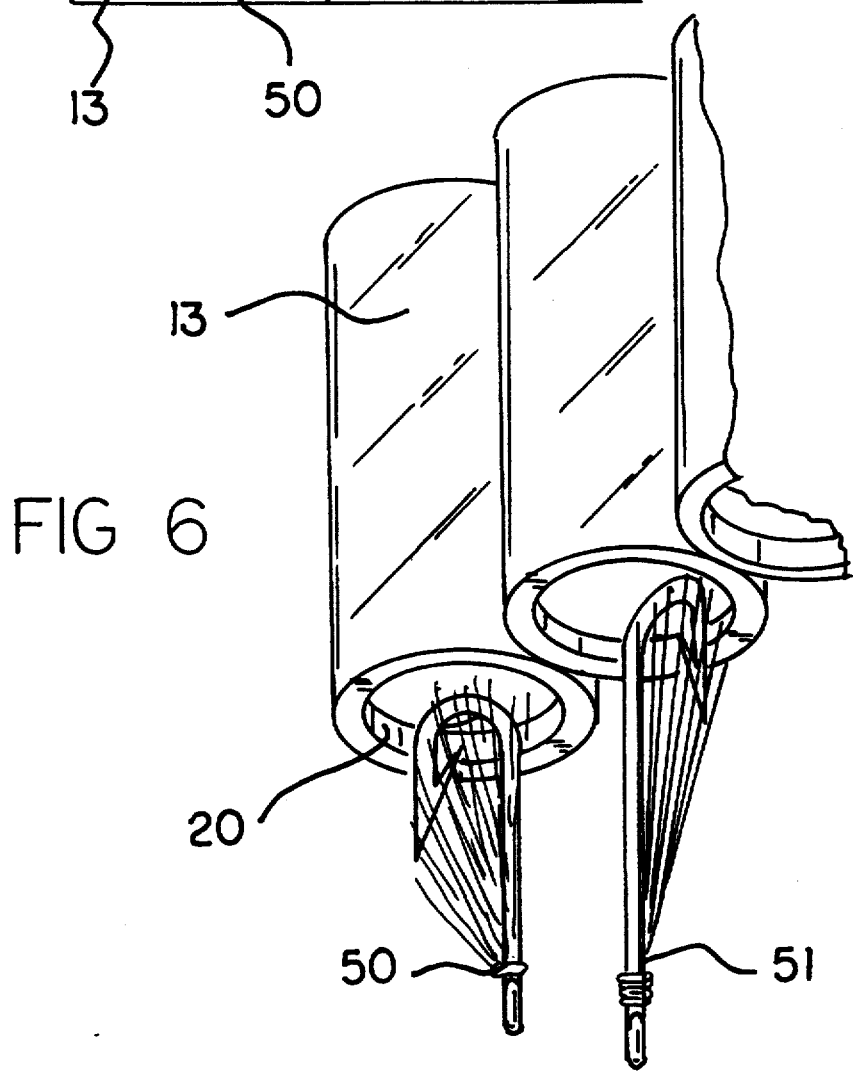
FIG. 6 is a fragmentary perspective view of the fly fisherman's lure holder in an inverted position and furthermore showing a disposition of fishing lures for manual extraction.

In FIGS. 5 and 6 the purpose of magnetic member 20 is described. In FIG. 5 fishing lures 50 and 51 are freely lying in separate adjoining compartments. When the unit 13 is inverted as in FIG. 6 the lures 50 and 51 fall under the influence of gravity but are prevented from falling from their respective compartments by the adherent qualities of magnetic member 20 and the ferromagnetic material forming the basis of most fishing lures.

Lure 50 is shown as the smaller of the two and when disposed for extraction as in FIG. 6 there should be no impediment to selection of the desired lure among lures 50 and 51. When The central portion 32 of compartment 12 comprises a rugged transparent or translucent thin walled tube of sufficient diameter and length to accept a wide range of fishing lure types. The central portion 32 may be colored, however, no colorant or other light absorption or diffusion technique employed shall preclude visual identification of a fishing lure held therein.

Compartment 12 is closed at the bottom portion wherein said closure may be perforated for the purpose of ventilation and drainage. Singular unit 13 is formed by permanently adjoining a multiplicity of compartments 12 in a linear array such that the tops of all compartments 12 lie in a common plane, and furthermore the longitudinal axes of tubular compartments 12 also lie in a common plane.

The specific technique for permanently joining said compartments 12 may require the production of a flat region on adjoining compartments subsequently co-adhered using an adhesive, or the use of a thixotropic beading adhesive which does not require the flat regions. Or, the entire singular unit 13, excepting magnetic members 20, may be formed as a single piece using conventional casting or injection molding techniques.

Permanent magnetic members 20 comprise magnetized ferromagnetic materials such as aluminum-nickel-cobalt, cobalt, or samarium magnets formed as an annular ring having an outer diameter engaging the larger internal diameter of the top portion 30 of compartment 12 and having an inner diameter permitting the free passage of a variety of fishing lures into and out of compartment 12. The height of magnetic member 20 is capable of wide variation and is generally determined by the amount of magnetic material required to hold a given lure whenever the unit 13 is inverted. Said height of magnetic member 20 will generally not exceed the difference of the outer and inner diameters of magnetic member 20.

Eyelet 16 is permanently affixed to the outside and bottom of a compartment 12 being at one or the other end of the singular unit 13. Alternately, the eyelet 16 may be affixed at an un limited number of sites anywhere on the outer surface of unit 13 with preference given to sites on either end of unit 13 near the top or bottom of an end compartment 12. Strap means 18 comprises a simple elongated strap member terminating in a loop 17 formed through eyelet 16 at one end and a hook member 19 at the other end. Hook member 19 is attachable to the belt, or belt loop, or buttonhole of a fisherman's garment.

Figure 7:
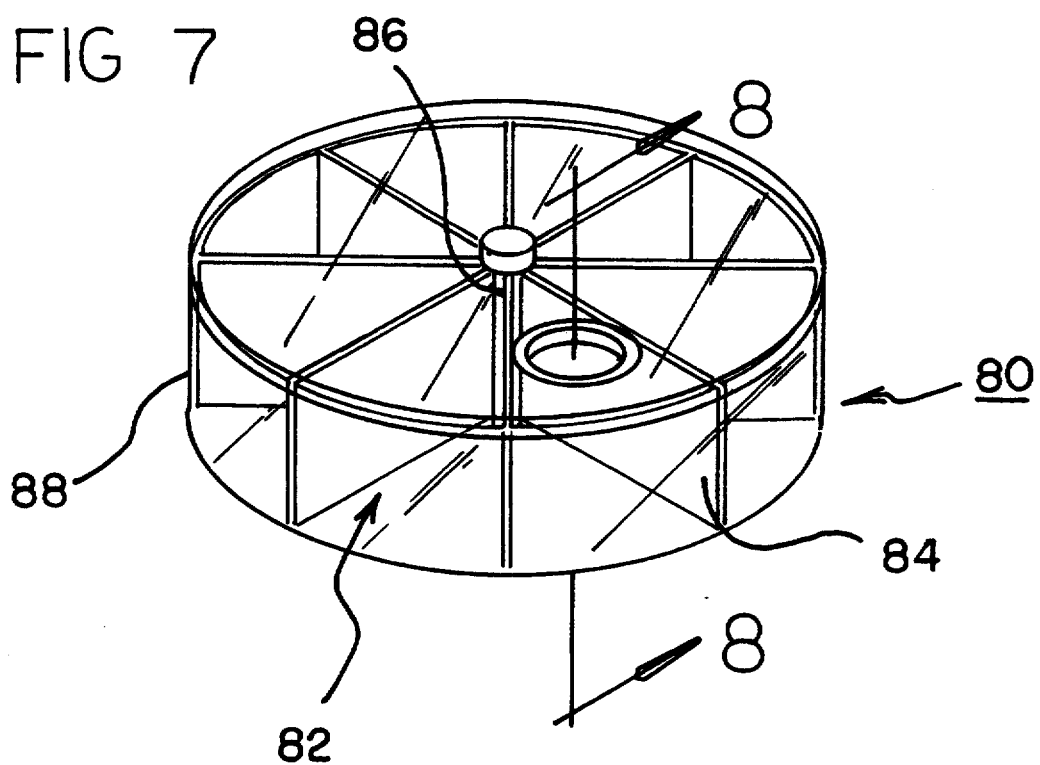
FIG. 7 is a perspective view of an alternate embodiment of the fly fisherman's lure holder showing a multiplicity of wedge cross section compartments.
Figure 8:
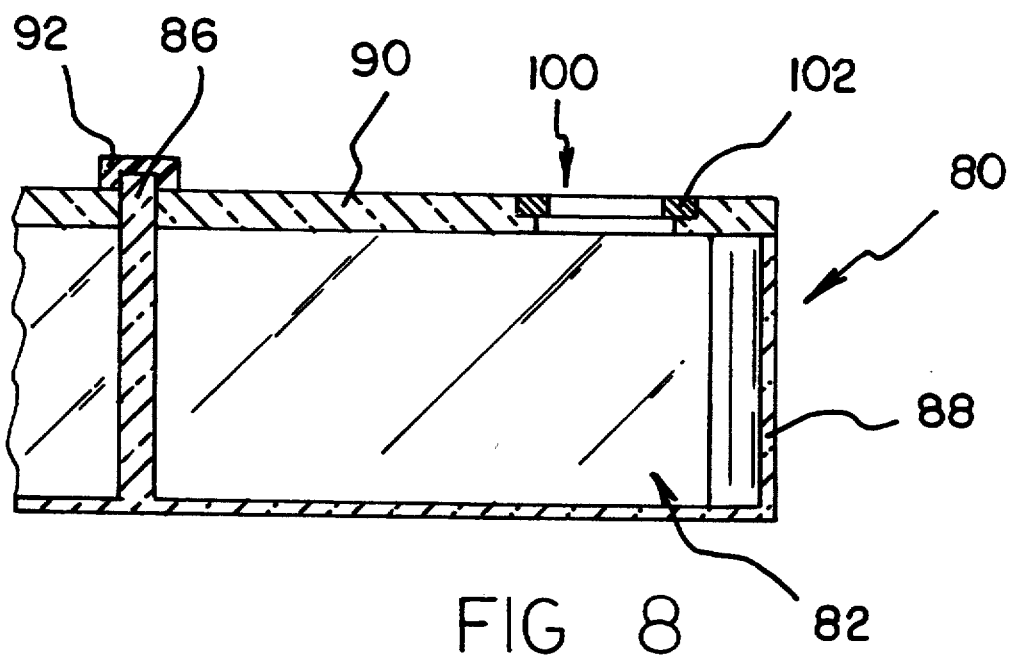
FIG. 8 is a fragmentary sectional view of the alternate embodiment of the fly fisherman's lure holder taken substantially upon the plane indicated by the section line 8—8 of FIG. 7.

In an alternate embodiment of the fly fisherman's lure holder 80 the aforementioned linear array of tubular compartments is replaced by a series of interjoined wedge shaped compartments 82 having planar walls 84 radially disposed from a central cylindrical member 86 and an outer wall 88 being a portion of an outer cylindrical member. See FIGS. 7 and 8.

A bottom member is permanently affixed to planar walls 84 and outer wall 88 and a top member 90 is perforated at the center at which location top member 90 rotatably engages central cylindrical member 86. Cap 92 prevents top member 90 from becoming disengaged from central cylindrical member 86. Top member 90 is also perforated with stepped aperture 100 within which annular permanent magnet 102 is affixed. Stepped aperture 100 with magnet 102 attached is of suitable minimum diameter to permit free passage of a wide variety of fishing lures.

When operationally disposed the top member 90 may be rotated to position aperture 100 over a compartment of interest and a fishing lure may be loaded or extracted as desired. Extraction of a particular lure with one hand while actively engaged in fishing is accomplished by rotating the aperture 100 over the lure desired using a thumb or finger, inverting the fly fisherman's lure holder 80 wherein the lure falls partially through the aperture 100 before being stopped by the influence of the magnetic field of magnet 102. The lure may now be plucked from the magnet 102 and used as the fisherman desires.

The fly fisherman's lure holder 10 may be disposed to hold a variety of lures and is not limited to flies used in the specific style known as fly fishing. Without modification, the fly fisherman's lure holder can hold bare hooks, provided they are not of stainless steel or other non-ferromagnetic composition, and an assortment of other lure styles. In addition the fly fisherman's lure holder may be employed by carpenters and furniture builders to hold an assortment of nails or steel screws for easy access.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A new and improved fly fisherman's lure holder for holding fishing lures and permitting selection and extraction of a single lure using one hand comprising:

a multiplicity of permanently adjoined elongated tubular structures each having an open top portion, a central portion, and a closed end bottom portion wherein said tubular structures are of sufficient inside diameter and length to accommodate a variety of fishing lures individually, said multiplicity of permanently adjoined tubular structures comprising at least three transparent plastic tubes with circular cross-sections, the closed end of said tubular structures being perforated with one or more holes having a maximum perforation dimension substantially smaller than the tubular structure bore diameter, a multiplicity of annular permanent magnets individually affixed to a step in the open top portion of each said tubular structures, an eyelet affixed to at least one adjoined tubular structures, a means for disposition of said tubular structures upon the clothing worn by humans while practicing fishing, said disposition means engaging said eyelet, said means for disposition upon the clothing of a fisherman comprising a strap having a first end portion, a central portion, and a second end portion wherein, the first end portion comprising a fixed Loop engaging an eyelet of the tubular structures, the central portion comprising an elongated strap, and the second end portion comprising a hook for attachment to the clothing worn by the fisherman wherein said hook can only be engaged or disengaged by the intentional action of a human.

2. A new and improved fly fisherman's lure holder for holding fishing lures and permitting selection and extraction of a single lure using one hand comprising:

a multiplicity of permanently adjoined wedge shaped structures each having a closed end wherein said wedge shaped structures are of sufficient inside dimension to accommodate a variety of fishing lures individually, a rotatable top cover having a small central hole and a large hole located substantially toward the outer portion of said top cover, a single annular permanent magnet affixed to the large hole in the rotatable top cover, an eyelet affixed to the exterior of the fly fisherman's lure holder, and a means for disposition of said wedge shaped structures upon the clothing or equipment worn by humans while practicing fishing, said disposition means engaging said eyelet.

* * * * *